(12) United States Patent
Klein et al.

(10) Patent No.: US 10,017,031 B2
(45) Date of Patent: Jul. 10, 2018

(54) HEAT EXCHANGER ARRANGEMENT FOR HEAT UPTAKE AND AIR CONDITIONING SYSTEM OF A MOTOR VEHICLE

(71) Applicant: VISTEON GLOBAL TECHNOLOGIES, INC., Van Buren Township, MI (US)

(72) Inventors: Torsten Klein, Köln (DE); Roberto Della Rovere, Kerpen (DE); Marc Graaf, Krefeld (DE); Gerald Richter, Aachen (DE); Felix Girmscheid, Köln (DE)

(73) Assignee: HANON SYSTEMS, Daejeon-si (KR)

( * ) Notice: Subject to any disclaimer, the term of this patent is extended or adjusted under 35 U.S.C. 154(b) by 1095 days.

(21) Appl. No.: 14/032,805

(22) Filed: Sep. 20, 2013

(65) Prior Publication Data

US 2014/0075974 A1 Mar. 20, 2014

(30) Foreign Application Priority Data

Sep. 20, 2012 (DE) .................. 10 2012 108 891

(51) Int. Cl.
*B60H 1/32* (2006.01)
*B60H 1/00* (2006.01)

(52) U.S. Cl.
CPC ....... *B60H 1/3202* (2013.01); *B60H 1/00028* (2013.01); *B60H 1/00057* (2013.01); *B60H 2001/00085* (2013.01); *B60H 2001/00092* (2013.01); *B60H 2001/00178* (2013.01)

(58) Field of Classification Search
CPC ............ B60H 1/00028; B60H 1/00057; B60H 1/3229; B60H 2001/00092; B60H 2001/00178; B60H 2001/3288; B60H 2001/3289

See application file for complete search history.

(56) References Cited

U.S. PATENT DOCUMENTS 3,834,451 A 9/1974 Kozinski
6,189,801 B1 2/2001 Klingler et al.
(Continued)

FOREIGN PATENT DOCUMENTS

DE 69301747 T2 7/1996
DE 60309828 T2 5/2007
(Continued)

*Primary Examiner* — Elizabeth Martin
*Assistant Examiner* — Zachary R Anderegg
(74) *Attorney, Agent, or Firm* — Shumaker, Loop & Kendrick, LLP; James D. Miller

(57) ABSTRACT

The invention concerns an air conditioning system for conditioning the air of a passenger compartment of a motor vehicle including a housing with a first flow channel and a second flow channel for conducting air and a refrigerant circuit with an evaporator and a condenser. The evaporator is arranged in the first flow channel and the condenser in the second flow channel. The air conditioning system is designed for cooling and heating the passenger compartment and for a reheat operation. The setting of the operating mode is done only via the controlling of air guidance mechanisms. One of the heat exchangers evaporator or condenser is arranged with a part of the heat transfer surface in both the first and the second flow channel.

19 Claims, 8 Drawing Sheets

(56) References Cited

U.S. PATENT DOCUMENTS

| | | | |
|---|---|---|---|
| 6,293,123 B1 * | 9/2001 | Iritani | B60H 1/3205 62/197 |
| 6,308,770 B1 * | 10/2001 | Shikata | B60H 1/00064 165/126 |
| 2002/0017383 A1 | 2/2002 | Vincent | |
| 2005/0279843 A1 | 12/2005 | Dieksander et al. | |

FOREIGN PATENT DOCUMENTS

| | | | |
|---|---|---|---|
| DE | 102005057392 A1 | 5/2007 | |
| DE | 102009028522 A1 | 5/2011 | |
| FR | 2743027 A | 7/1997 | |
| FR | 2743027 A1 | 7/1997 | |
| JP | 05-221229 A | 8/1993 | |
| JP | 06-040236 A | 2/1994 | |
| JP | H06171347 A | 6/1994 | |
| JP | H0671220 U | 10/1994 | |
| JP | H08238919 A | 9/1996 | |
| JP | H10244827 A | 9/1998 | |
| JP | 10329535 A | 12/1998 | |
| JP | H10329535 A | 12/1998 | |
| JP | H11115450 A | 4/1999 | |
| JP | 2004501021 A | 1/2004 | |
| JP | 2011121488 A | 6/2011 | |
| JP | 2011121572 A | 6/2011 | |
| WO | WO 2012114767 A1 * | 8/2012 | B60H 1/00921 |

* cited by examiner

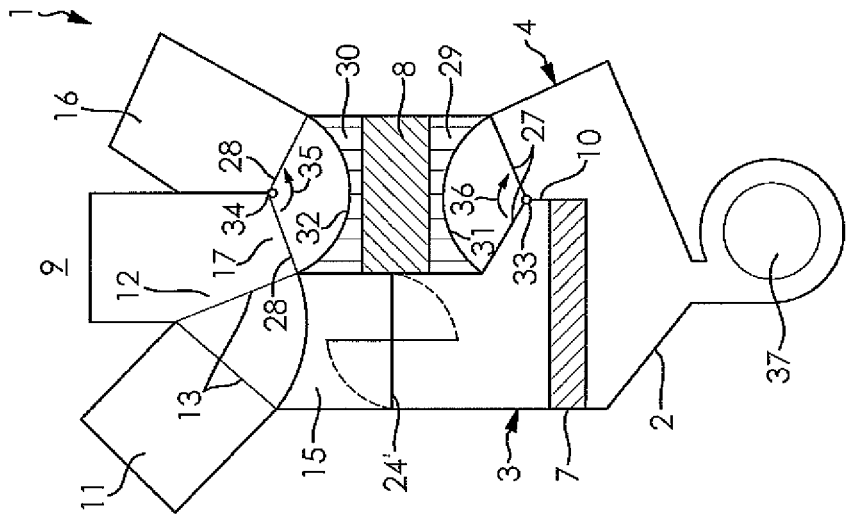

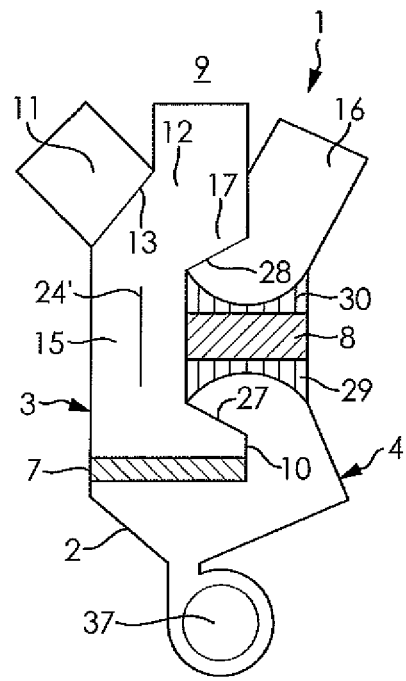
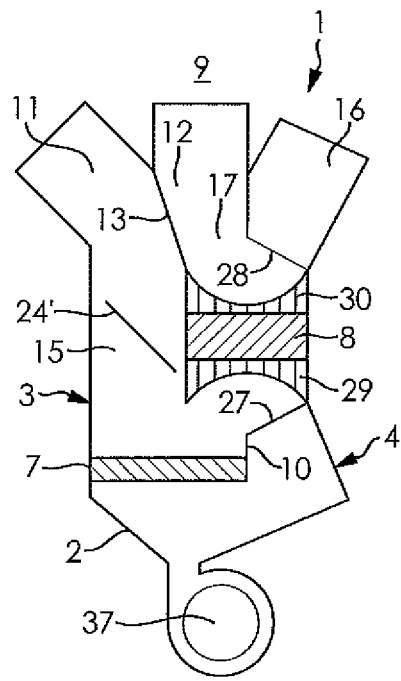
FIG. 4A  FIG. 4B
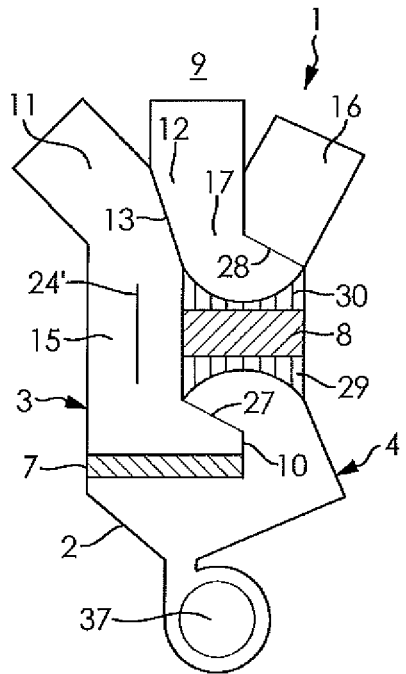
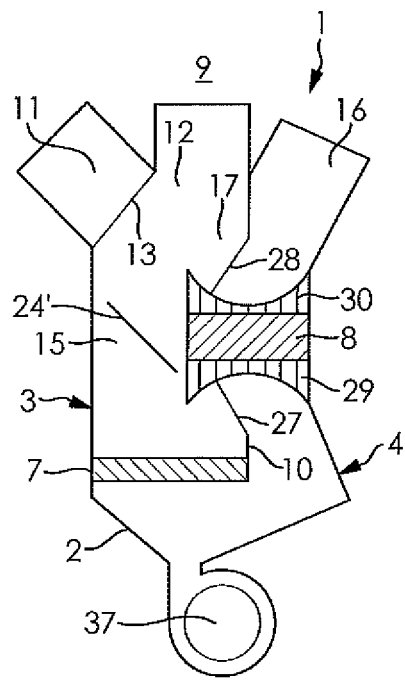
FIG. 4C  FIG. 4D

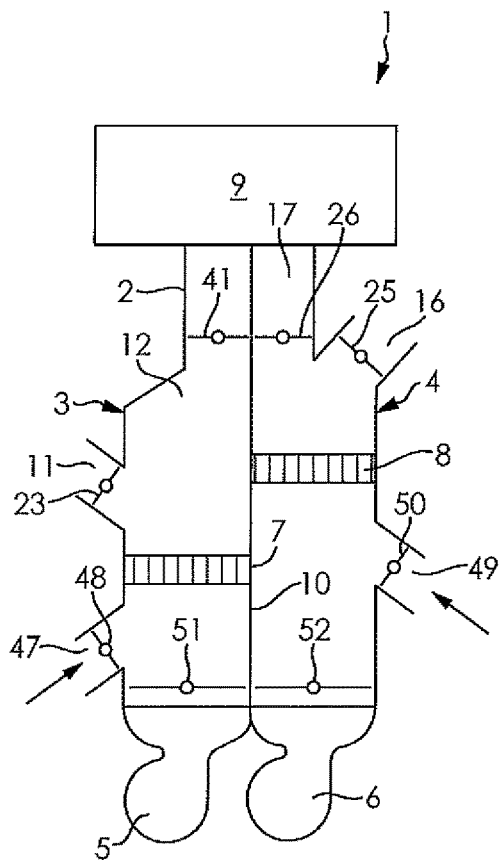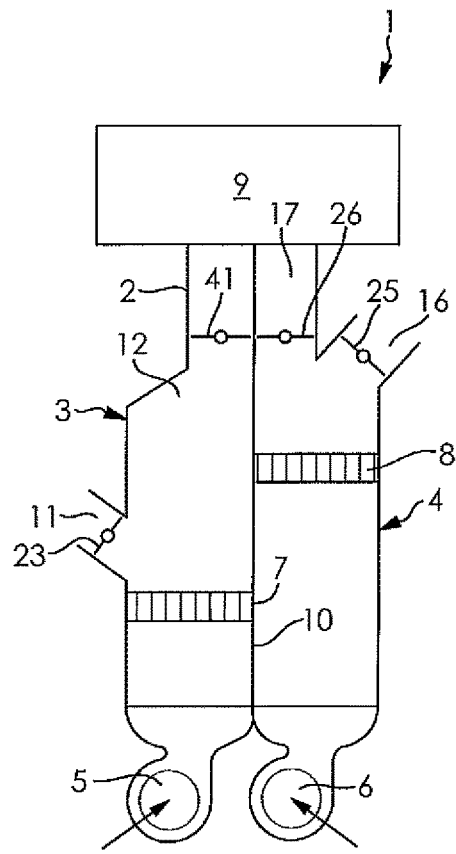
FIG. 8A    FIG. 8B
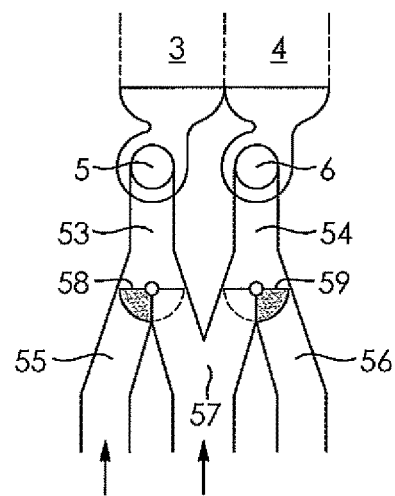
FIG. 9A

HEAT EXCHANGER ARRANGEMENT FOR HEAT UPTAKE AND AIR CONDITIONING SYSTEM OF A MOTOR VEHICLE

CROSS-REFERENCE TO RELATED APPLICATION

This application claims priority to German Non-Provisional Patent Application Serial No. DE 10 2012 108 891.8 filed Sep. 20, 2012, hereby incorporated herein by reference in its entirety.

FIELD OF THE INVENTION

The invention concerns an air conditioning system for conditioning the air of a passenger compartment of a motor vehicle. The air conditioning system has a housing with a first and a second flow channel for conducting the air, as well as a refrigerant circuit with an evaporator, a compressor, a condenser and an expansion element, wherein the evaporator is arranged in the first flow channel and the condenser in the second flow channel. Furthermore, the invention concerns an air guidance device for a heat exchanger and a method for operating the air conditioning system for a combined refrigeration and heating mode, as well as for a reheating mode for conditioning the air of the passenger compartment. The air guidance device has static and movable air guidance mechanisms, which separate two different air flow masses from each other.

BACKGROUND OF THE INVENTION

The air conditioning systems for motor vehicles in the prior art have long since had various individual components, such as the condenser traditionally arranged at the front of the vehicle, the compressor connected to the vehicle's engine and actuated by it, the evaporator arranged in the passenger compartment, as well as hoses and connections. The air conditioning system conditions the air which is then taken into the passenger compartment. The compressor is usually driven by the engine of the vehicle by coupling mechanical energy to the compressor shaft. Radiator fans and blowers draw electric power from the onboard 12 V network.

The components of the system are usually delivered separately to the vehicle manufacturing plant and installed there. Due to the many components, various installation steps are necessary, which in turn involve a large number of connections and make the installation a costly process. The connections to be made during the installation process are furthermore potential leakage sites, which may be very time consuming and cost-intensive to repair. Furthermore, the filling of the air conditioning system with refrigerant occurs only after the installation of all components belonging to the refrigerant circuit. This further increases the installation expense during the vehicle assembly process.

Air conditioning systems of this kind with coolant/air heat exchangers, which draw their heating power from the coolant circuit of an efficient internal combustion engine of the vehicle drive train, can no longer achieve the temperature level needed for a comfortable heating of the passenger compartment at low outside temperatures, such as below −10° C. The same holds for systems in vehicles with hybrid drive system. For these vehicles, the use of auxiliary heating concepts is necessary.

Glycol/air heat pumps also utilize the coolant of the internal combustion engine, but as a heat source. In this case, heat is taken away from the coolant. Consequently, the internal combustion engine will be operated for a longer time at low temperatures, which has a negative impact on the exhaust gas emissions and the fuel consumption. Due to the intermittent operation of the internal combustion engine in hybrid vehicles, a sufficiently high coolant temperature is not achieved in the case of long trips. Consequently, the start/stop operation of the internal combustion engine is suspended at low outside temperatures. The internal combustion engine will not be shut off.

Furthermore, there is a trend toward complete electrification of the drive train, such as vehicles powered by batteries or fuel cells. In this case, the waste heat of the internal combustion engine is no longer a possible heat source for heating the air.

Furthermore, the amount of energy that can be stored in the battery of the vehicle is less than the amount of energy that can be stored in the form of liquid fuel in the fuel tank. Thus, the power required for the air conditioning of the passenger compartment of an electric vehicle is furthermore an important influence on the travel range of the vehicle.

German Pat. Appl. Pub. No. DE 10 2009 028 522 A1 specifies a compact air conditioning system with an evaporator unit, a condenser unit and a component unit, as well as a refrigerant circuit. The evaporation unit and the condenser unit each have air-flow heat exchangers arranged in a housing, as well as a fan. The refrigerant circuit, comprising an evaporator, a condenser, and a reheater, is configured for a combined refrigerator and heat pump operation, as well as a reheating mode, while in the reheating mode the heating power of the reheater, configured as a condenser/gas cooler, and the cooling power of the evaporator can be regulated independently of each other. The operating modes of the air conditioning system are controlled by the refrigerant circuit. Thus, the air conditioning system fulfills the function of a heat pump, which is realized by means of an active switching within the refrigerant circuit, having a primary circuit and a secondary section formed from two flow pathways. The configuration of the refrigerant circuit with switching valves, however, leads to great complexity, which in turn causes high costs and great technical expense.

French Pat. Appl. Pub. No. FR 2 743 027 A1 shows a vehicle air conditioning system with a traditional refrigerant circuit, having only an evaporator, a compressor, a condenser, and an expansion element. The heat exchangers are arranged in separate flow channels, fashioned to be separate from each other at least by flow engineering. The flow channels have cross connections of bypasses. The air mass flows taken in by means of fans are conducted across the surfaces of the heat exchangers by closing and opening of valves, as well as conducting through the bypasses as needed and according to the operating mode. In this process, the air mass flows are cooled and/or dehumidified, or heated, and then taken into the passenger compartment and/or the outside.

Thus, air conditioning systems for vehicles are known in the prior art for a combined refrigerator and heat pump operation for heating, cooling and dehumidifying the air being conditioned and taken to the passenger compartment. The air conditioning systems are controlled either on the refrigerant circuit or the air side.

However, with air conditioning systems controlled on the air side, no operation in reheat mode is possible. In turn, the air conditioning systems designed for an additional reheat mode have a more complicated refrigerant circuit with a plurality of components, such as heat exchangers, switching valves, and expansion valves.

In the "reheat mode," the air taken to the passenger compartment is cooled and thus dehumidified, then the dehumidified air is slightly heated. In this operating mode, the required reheat power is usually less than the required cooling power for cooling and dehumidifying the air.

SUMMARY OF THE INVENTION

The problem of the present invention is to provide an air conditioning system with heating functionality, especially for use in motor vehicles. The refrigerant circuit should be designed only with a minimum of components and thus be cost favorable and low maintenance. Furthermore, the air conditioning system should be designed for the combined refrigeration and heat pump mode and the reheat mode for heating, cooling, and dehumidifying of the passenger compartment air being conditioned. Operation should be possible even in environments with heat sources of low capacity, such as energy-efficient combustion engines or hybrid drive systems composed of combustion engine and electric motor when no heat sources are available from the drive train, such as electrically power vehicles, while fulfilling all requirements for a comfortable climate in the passenger space.

Furthermore, the invention is based on the problems of providing a device with which two different air mass flows can be separated from each other and conveyed across the heat transfer surface of a heat exchanger, without the air mass flows mixing with each other, and to provide a method for operating the air conditioning system in a way that enables a very good regulating capability.

The problem is solved according to the invention by a system for conditioning the air of a passenger space of a motor vehicle. The air conditioning system has a housing with a first and a second flow channel for conducting air and a refrigerant circuit with an evaporator, a compressor, a condenser and an expansion element, wherein the evaporator is arranged in the first flow channel and the condenser in the second flow channel.

According to an embodiment of the invention, the air conditioning system is designed for a combined refrigerator and heating operation for cooling and heating the passenger compartment and for a reheat operation. The setting of the respective operating mode is done solely via the controlling of air guidance mechanisms arranged inside the housing of the air conditioning system and not by regulating the refrigerant circuit.

The refrigerant circuit, having an evaporator, a compressor, a condenser, a collector and an expansion element, essentially joined to each other only via refrigerant lines, is constructed with no dynamic seals against the surroundings and thus is technically free of leakage. The compact refrigerant circuit has the advantage of being filled with refrigerant prior to installation in the motor vehicle or prior to delivery of the air conditioning system.

The compact and pre-installable air conditioning system has one or two fans, while the flow channels in the configuration with two fans each receive air from a fan, and in the case of the configuration with one fan they receive air jointly. The air conditioning system can be arranged underneath the passenger compartment, on the front wall or in the trunk of the motor vehicle.

According to an embodiment of the invention, at least one of the heat exchangers evaporator or condenser of the refrigerant circuit is arranged with a part of the heat transfer surface in both the first flow channel and in the second flow channel. The portion of the heat transfer surface required for the particular operating mode, refrigerator operation, heating operation, or reheat operation, can be adjusted to take in air with the aid of the air guidance mechanisms.

In the heat pump mode, air volume flows in the range of 20 l/s to 300 l/s are conducted across the evaporator, especially in the range of 100 l/s to 200 l/s. In the refrigerator mode, air volume flows in the range of 20 l/s to 300 l/s, especially in the range of 100 l/s to 200 l/s, across the condenser.

The air conditioning system with heat pump functionality, that is, with the cooling and/or dehumidifying of a first air mass flow and the simultaneous heating of a second air mass flow, can be operated advantageously in a reheat mode. The reheat mode is possible as a pure reheat mode, that is, without the mixing in of unconditioned air. The overall air mass flow being heated is cooled down and/or dehumidified as it flows across the heat transfer surface of the evaporator prior to the heating. The process of cooling and/or dehumidifying of the air, as well as that of heating or reheating of the air, is controlled only at the air side. The refrigerant circuit is operated independently of the different operating modes.

A modification of the invention consists in arranging part of the heat transfer surface of the evaporator or condenser outside of the housing of the air conditioning system.

According to an embodiment of the invention, the portion of the heat transfer surface of the condenser inside the flow channels can be varied continuously by means of the air guidance mechanisms. The heat transfer surface of the condenser can be arranged either entirely in the first or in the second flow channel, so that either the air mass flow delivered by the first flow channel or that delivered by the second flow channel flows across the heat transfer surface and becomes heated. In all intermediate stages, both the air mass flow of the first and that of the second flow channel flows across a portion of the heat transfer surface, while the mixing of the air mass flows is negligibly slight.

Each flow channel can advantageously be supplied with fresh air from the outside, circulating air from the passenger compartment, or a mixture of fresh air and circulating air. The flow channels are preferably arranged so that the main flow directions of the air within the flow channels are oriented parallel to each other and point in a common direction. At least the flow directions of the air mass flows in the direction of the passenger compartment are essentially identical.

One embodiment of the invention is that the air mass flows conditioned by flowing through the flow channels can be diverted by flow paths into the passenger compartment and/or by flow paths to the outside.

The problem of providing a device with which two different air mass flows can be separated from each other and conveyed across the heat transfer surface of a heat exchanger without the two air mass flows mixing is solved by an air guidance device according to an embodiment of the invention. The air guidance device has static and movable air guidance mechanisms which separate the two different air mass flows from each other.

According to an embodiment of the invention, a first static air guidance mechanism is arranged in the air flow direction upstream from the heat exchanger and a second static air guidance mechanism is arranged in the air flow direction downstream from the heat exchanger, the static air guidance mechanisms being arranged each bordering on the heat exchanger. Furthermore, a first movable air guidance mechanism is arranged in the air flow direction upstream from the first static air guidance mechanism and a second movable air guidance mechanism is arranged in the air flow direction downstream from the second static air guidance mechanism. Thus, the sequence of components in the air flow direction becomes: first movable air guidance mechanism, first static air guidance mechanism, heat exchanger, second static air guidance mechanism, and second movable air guidance mechanism.

The movable and static air guidance mechanisms bordering on each other have shapes or outer contours adapted to each other at their mutually facing sides so that the two different air mass flows separated from each other are conveyed across the heat transfer surface of the heat exchanger with minimal or negligible, and ideally no mixing. The two air mass flows can be divided over any desired portions of the heat transfer surface.

According to one embodiment of the invention, the movable air guidance mechanisms are configured as valves, each describing a straight plane and mounted able to swivel about a pivot axis. The valves each have two pairs of side edges opposite and oriented in parallel to each other, wherein one pair of the side edges is oriented in the air flow direction and one pair of the side edges is oriented perpendicular to the air flow direction.

The pivot axis of the first movable air guidance mechanism is preferably arranged on the side edge oriented perpendicular to the air flow direction against which the air flows. The pivot axis of the second movable air guidance mechanism is arranged on the side edge oriented perpendicular to the air flow direction from which the air flows away. The freely movable side edges that are arranged opposite the side edges connected to the pivot axis are each oriented in the direction of the static air guidance mechanisms.

The pivot axes of the movable air guidance mechanisms are advantageously arranged at a distance away from the closest edge of the static air guidance mechanisms each time, which corresponds to the dimension of the movable air guidance mechanisms in the air flow direction. The distance from the closest edge of the static air guidance mechanisms is constant each time.

According to an embodiment of the invention, the static air guidance mechanisms are configured as air baffles. The air baffles are spaced apart, arranged in parallel to each other, joined by cross connections to each other and oriented in the air flow direction. Taken together, the air baffles and the cross connections form a lattice. The dimension of the air baffles in the air flow direction is termed the length of the air baffle, which also corresponds to the depth of the lattice.

The air baffles are arranged flush on the sides facing the heat exchanger, and thus the ends or side edges of the air baffles form a straight, level surface, which is provided with air passages. The side edges of the air baffles arranged opposite these side edges in the air flow direction, that is, the side edges oriented in the direction of the static air guidance mechanisms, form advantageously concave shaped surfaces, which are likewise provided with air passages. The concave curved surfaces are created by different lengths of the air baffles, the air baffles arranged at the outer edges of the lattice having the greatest length and the lengths of the air baffles arranged next to them decrease uniformly. The adjacent air baffles have constant distances from each other. The concave curved surfaces preferably have a constant radius, and the center axes of the surfaces correspond to the pivot axes of the adjacent movable air guidance mechanisms. The radii of the surfaces curved in a circular arc correspond at the same time to the lengthwise dimension of the movable air guidance mechanisms in the air flow direction.

The air guidance device according to the invention is used inside the air conditioning system for conditioning of the air of the passenger compartment of the motor vehicle and is preferably used in connection with the condenser of the refrigerant circuit.

In the method for operating the air conditioning system for the combined refrigerator and heating operation and for the reheat operation for the conditioning of the air of the passenger compartment of the motor vehicle, according to an embodiment of the invention, the switching between the operating modes is realized exclusively by regulating the position of the air guidance mechanisms and thus by regulating the division of the partial mass flows on the air side by the flow channels and across the heat transfer surfaces of the evaporator and/or the condenser of the refrigerant circuit.

The portions of the heat transfer surface of the condenser within the flow channels is adjusted by means of an air guidance device and the partial mass flows going to the passenger compartment are regulated such that the required temperature of the intake air for satisfactory comfort is achieved.

The solution of the invention has various benefits: efficient air conditioning system for simultaneous dehumidification and heating; quick providing of warm air at low outdoor temperatures and cold engine cooling water in the case of motor vehicles with internal combustion engine; reduction of the power needed to heat up the passenger compartment by circulating air operation and/or by specific air guidance within the flow channels; efficient heating operation by warming of the refrigerant at the suction pressure side above the outdoor temperature, the evaporator being supplied with circulating air or partial circulating air, so that the air temperature upstream from the evaporator is higher than the temperature of the outdoor air; reserving or stockpiling the required refrigerant quantity for refrigerator and heating operation; refrigerant circuit is pre-fillable and (semi-)hermetic, with no dynamic seals against the surroundings; minimal complexity in the refrigerant circuit, that is, basically no switching valves and minimization of the number of expansion valves, heat exchangers, and refrigerant lines; flexible layouts of the air conditioning system are possible in the motor vehicle, for example, in subfloors, in the trunk space, on the bulkhead, and; air not needed in the passenger compartment is taken away to the outside.

BRIEF DESCRIPTION OF THE DRAWINGS

Further details, features and benefits of the invention will emerge from the following description of sample embodiments with reference to the corresponding drawings. There are shown:

FIG. 3A: air conditioning system with centrally arranged condenser and four valves;

FIG. 3B: air conditioning system with one fan;

FIG. 4A: air conditioning system of FIG. 3B in refrigerator mode;

FIG. 4B: air conditioning system of FIG. 3B in heating mode with dehumidification;

FIG. 4C: air conditioning system of FIG. 3B in heating mode;

FIG. 4D: air conditioning system of FIG. 3B in hybrid mode;

FIG. 8A: modification of the air conditioning system of FIG. 7 with check valves;

FIG. 8B: air conditioning system with driving wind ducted through the impellers of the fan;

FIG. 9A: partial region of the air conditioning system with the flow paths arranged upstream from the fans in the air flow direction with valves for feeding driving wind to the fan per FIG. 8B;

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
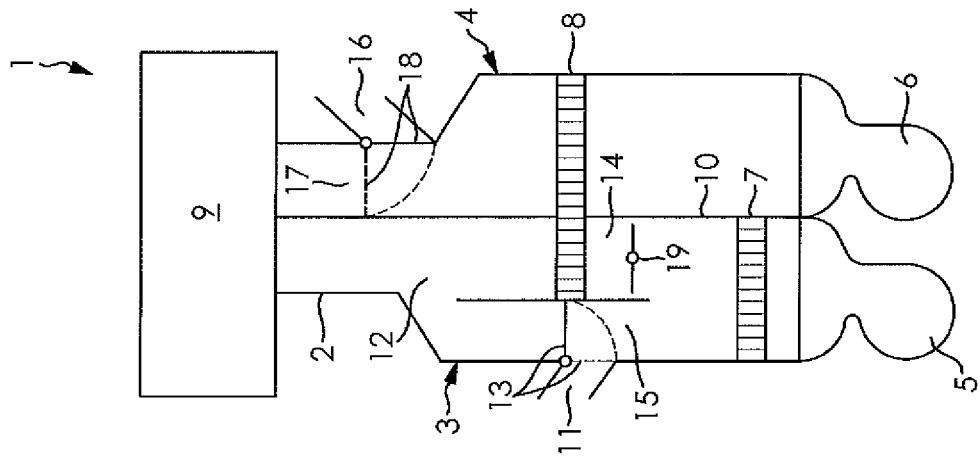
FIG. 1: air conditioning system with six valves, in heating mode.

FIG. 1 shows an air conditioning system 1 with a housing 2, having a first flow channel 3 as well as a second flow channel 4, wherein each flow channel 3, 4 is associated with a fan 5, 6 and can be supplied with fresh air from the outside, circulating air from a passenger compartment 9, or a mixture of both.

In the first flow channel 3 is arranged an evaporator 7 and in the second flow channel 4 a condenser 8, both of these being configured as components of a refrigerant circuit of the air conditioning system 1 and as air-fed heat exchangers. The evaporator 7 occupies the entire flow cross section of the flow channel 3. The condenser 8 spans the flow channels 3, 4 and has two regions. The first region is arranged inside the second flow channel 4, covering the entire flow cross section, and has a larger heat transfer surface than the second region. The condenser 8 extends in its dimension into the first flow channel 3, so that the second region of the condenser 8 is arranged inside a flow path 14 of the first flow channel 3. The second region of the condenser 8 occupies the entire flow cross section of the flow path 14. The regions of the condenser 8 are bounded off by a partition wall 10 between the flow channels 3, 4.

The separately controllable fans 5, 6 produce a favorable dynamics of the air conditioning system 1, since the first flow channel 3 with the evaporator 7 and the second flow channel 4 with the condenser 8 can be supplied with air mass flows of different velocities and thus can respond quickly to altered operating conditions.

The fan 5 of the first flow channel 3 carries the intake air as an air mass flow to the evaporator 7. In flowing across the heat transfer surfaces of the evaporator 7, the air mass flow is cooled down and/or dehumidified.

The cold air mass flow leaving the evaporator 7 is divided as a partial air mass flow via the cold air flow path 11 into the outside air and into a partial air mass flow via the cold air flow path 12 into the passenger compartment 9 in a required ratio, or assigned entirely to one of the cold air flow paths 11, 12. The cold air mass flow is divided by means of an air guidance mechanism 13, configured as a valve. The air mass flow carried by the cold air flow path 12 is diverted at the flow path 14 and thus taken as the bypass flow through the bypass channel 15 around the condenser 8.

Similar to the fan 5, the fan 6 takes in air and carries the intake air as an air mass flow to the condenser 8. In flowing across the heat transfer surfaces of the condenser 8, the air mass flow is heated. The warm air mass flow leaving the condenser 8 is divided as a partial air mass flow via a warm air flow path 16 into the outside air and into a partial air mass flow via a warm air flow path 17 into the passenger compartment 9 in a required ratio, or assigned entirely to one of the warm air flow paths 16, 17. The warm air mass flow is divided by means of an air guidance mechanism 18, configured as a valve.

In the refrigerator mode, that is, cooldown of the air supplied to the passenger compartment 9, the air guidance mechanisms 19, 20, 21, 22 are closed. The air guidance mechanism 13 is designed such that the air mass flow is led through the cold air flow path 12 to the passenger compartment 9, while the cold air flow path 11 is closed. The air guidance mechanism 18 is designed such that the air mass flow is led through the warm air flow path 16 to the outside, while the warm air flow path 17 to the passenger compartment 9 is closed.

The fan 5 delivers the air through the first flow channel 3 to the evaporator 7. The air is cooled down and dehumidified, and it flows through the cold air flow path 12 into the passenger compartment 9. The fan 6 delivers the air in the second flow channel 4 to the condenser 8. The air is heated and taken through the warm air flow path 16 to the outside.

In heat pump mode, that is, heating of the air supplied to the passenger compartment 9, the air guidance mechanisms 20, 21 configured as valves are opened. The air guidance mechanism 13 is designed such that the air mass flow is led through the cold air flow path 11 to the outside, while the cold air flow path 12 is closed. The air guidance mechanism 18 is designed such that the air mass flow is led through the warm air flow path 17 to the passenger compartment 9, while the warm air flow path 16 is closed. The air guidance mechanisms 19, 22 are closed.

The fan 5 delivers the air through the first flow channel 3 to the evaporator 7. The air is cooled down and flows through the cold air flow path 11 to the outside. The fan 6 delivers the air through the second flow channel 4 to the condenser 8. The air is heated and taken through the warm air flow path 17 to the passenger compartment 9.

In the reheat mode, the air guidance mechanisms 13, 18, 19, 20, 21, 22 are arranged in various positions as needed, between fully open and fully closed. The air mass flow being heated is varied by the settings of the air guidance mechanisms 13, 19, 22 and the speed of the fan 5.

Figure 2A:
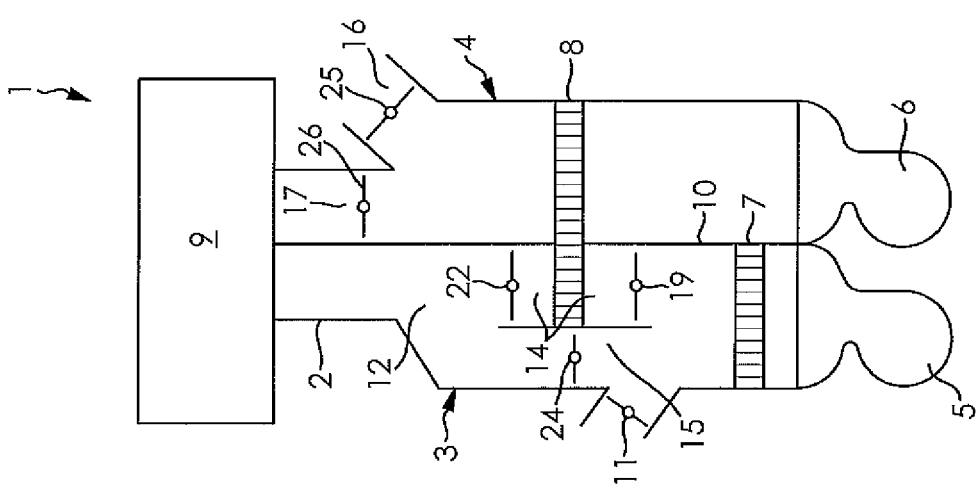
FIG. 2A: air conditioning system with closed air guidance mechanisms.

Alternatively, the air guidance mechanisms 13, 19, configured as valves, can each be configured as two separate valves 23, 24, 25, 26, the two valves 23, 24 being arranged inside the cold air flow paths 11, 12 and the two valves 25, 26 inside the warm air flow paths 16, 17, as can be seen in FIG. 2a. The two valves 23, 24 and 25, 26 can each be coupled by a kinematic device and adjusted by means of a single drive unit. The separate configuration of the valves 23, 24, 25, 26 and the configuration as a common valve 13, 18 also applies to each of the configurations of the air conditioning system 1 described hereafter.

Furthermore, it is clear from FIG. 2A that, in an alternative embodiment, no air guidance mechanisms 20, 21 are configured as a connection between the flow path 14 of the first flow channel 3 and the second flow channel 4. In the embodiment of the air conditioning system 1 per FIG. 2A, as compared to the embodiment of FIG. 1, only the condenser 8 is designed differently for the refrigerator mode, since only the heat transfer surface of the condenser 8 arranged in the second flow channel 4 can be considered. The region of the condenser 8 arranged in the flow path 14 can only be used for the reheat mode.

Figure 2B:
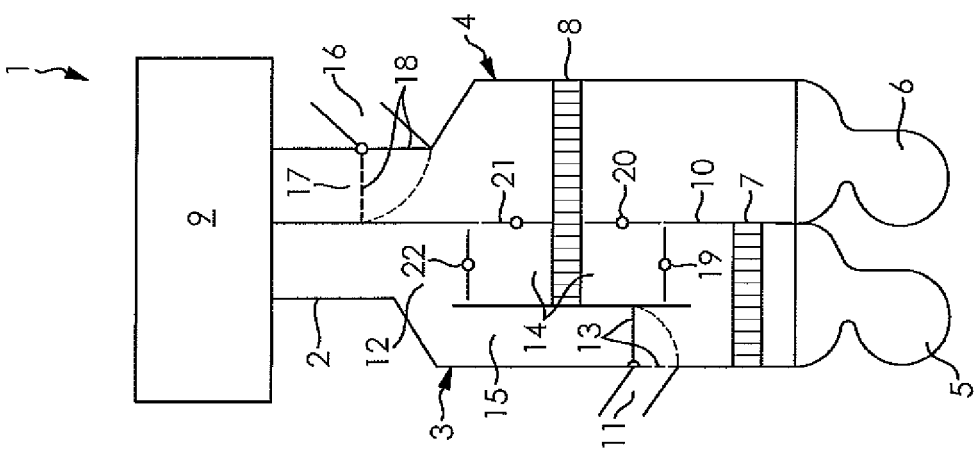
FIG. 2B: air conditioning system with three valves, in heating mode.

The embodiments of FIG. 2A and FIG. 2B differ in that, instead of the air guidance mechanisms 19 and 22, only the air guidance mechanism 19 is provided, which bounds off the flow path 14 from the flow channel 3. One can eliminate the air guidance mechanism 22 of the embodiment in FIG. 2A, since the heat transferred from the condenser 8 to the cooled air mass flow in the cold air flow path 12 is minimal in the refrigerator mode. As FIG. 2B shows, at least the three air guidance mechanisms 13, 18 and 19 need to be provided to ensure the functioning of the air conditioning system 1.

In the embodiment of FIG. 3A, the condenser 8 is centrally arranged inside the flow channels 3, 4. By central arrangement is meant an orienting of the condenser 8 in relation to the partition wall 10 which divides the condenser 8 into two equally sized regions. The first region is arranged inside the second flow channel 4 and covers the entire flow cross section of the flow channel 4. The second region of the condenser 8 is arranged inside the first flow channel 3 and covers only a partial cross section of the flow channel 3. The flow cross section not covered by the condenser 8 corresponds to a bypass channel 15 of the embodiments in FIGS. 1, 2A and 2B.

The first and the second flow channel 3, 4 are separated from each other by the partition wall 10, as well as by two additional air guidance mechanisms 27, 28 configured as movable valves and by static air guidance mechanisms 29, 30 configured as air baffles. The air mass flow taken through the condenser 8 is determined according to the speed of the fan 6 and by the setting of the air guidance mechanisms 27, 28.

The air guidance mechanisms 27, 28 and the air baffles 29, 30, having shapes adapted to each other form an air guidance device for the heat exchanger and serve to prevent a mixing of the air mass flow inside the first flow channel 3, which has been cooled down and conditioned by flowing through the evaporator 7, with the non-conditioned air mass flow of the second flow channel 4.

The air baffles 29, 30 are oriented parallel to the partition wall 10, so that the air mass flows moving along the partition wall 10 do not experience any deflection of flow direction as they approach the air baffles 29, 30 and flow past or through them.

The air baffles 29, 30 project into the flow channels 3, 4 on either side and thus are further removed from the partition wall 10 have an increasing length L. The further the air baffles 29, 30 are arranged from the partition wall 10, the greater the length L of the air baffles 29, 30. The lengths L of the air baffles 29, 30 situated alongside each other increase so that the ends of the overall arrangement of air baffles 29, 30 form two concave shaped surfaces 31, 32. The surfaces 31, 32 are each rectangular in configuration and are curved uniformly about a pivot axis 33, 34, which are oriented parallel to the surfaces 31, 32, so that the first two opposite side edges of the surfaces 31, 32 each form a straight line, while the second two opposite side edges describe a circular arc. The midpoints of the circular arcs constitute the axes 33, 34 about which the rectangular surface 31, 32 is curved. The pivot axes 33, 34 correspond to the pivot axes 33, 34 of the air guidance mechanisms 27, 28. The radii of the circular arc shaped surfaces 31, 32 correspond to the lengthwise dimension of the air guidance mechanisms 27, 28, that is, the dimension of the air guidance mechanisms 27, 28 in the flow direction of the air mass flow through the flow channels 3, 4.

The air guidance mechanisms 27, 28 are oriented with the side edge away from the pivot axes 33, 34 toward the concave curved surface 31, 32 subtended by the ends of the air baffles 29, 30. For free mobility of the air guidance mechanisms 27, 28, a gap of minimal width remains between the surface 31, 32 and the side edge of the air guidance mechanism 27, 28 affects the movement of the air mass flow little if at all.

By simultaneous turning of the air guidance mechanisms 27, 28 about the respective pivot axes 33, 34 in opposite directions of rotation about the turning axes 35, 36, the proportion of the regions of the condenser 8 in the first flow channel 3 and in the second flow channel 4 can be adjusted. The dividing of the regions of the condenser 8 can be essentially continuous. Possible stages during the turning of the air guidance mechanisms 27, 28 result from the spacing of the air baffles 29, 30 perpendicular to the flow direction of the air mass flows through the flow channels 3, 4. The air guidance mechanisms 27, 28 are oriented, after the rotation, such that the side edges parallel to the pivot axis 33, 34 and away from the pivot axis 33, 34 are opposite one end of an air baffle 29, 30, so that the air mass flow can move along a continuous flow surface. The leakage flow resulting at intermediate positions of the air guidance mechanisms 27, 28 in relation to the air baffles 29, 30 is negligible. An intermediate position is a position of the air guidance mechanisms 27, 28 in which the side edges of the air guidance mechanisms 27, 28 are not exactly opposite an edge of one of the air baffle 29, 30, but instead arranged between two of the air baffles 29, 30.

When the air guidance mechanisms 27, 28 are turned in the direction of turning axes 35, 36 as far as the greatest lengthwise dimension of the air baffles 29, 30, that is, reaching the outer housing wall of the second flow channel 4, the entire condenser 8 is situated inside the first flow channel 3. The air guidance mechanisms 27, 28 are located in the first end position. When the air guidance mechanisms 27, 28 are turned opposite the directions of rotation or turning axes 35, 36 as far as the greatest lengthwise dimension of the air baffles 29, 30, that is, in the direction of the outer housing wall of the first flow channel 3 or in the direction of the bypass channel 15, the entire condenser 8 is situated inside the second flow channel 4. The air guidance mechanisms 27, 28 are located in the second end position. Besides the two end positions, the air guidance mechanisms 27, 28 can be set in intermediate positions. The average intermediate position is shown in FIG. 3A.

In pure refrigerator mode or pure heating mode, the air guidance mechanisms 27, 28 are situated in the second end position. The condenser 8 is arranged with the heat transfer surface entirely inside the second flow channel 4.

In the refrigerator mode, the air guidance mechanism 13 opens the bypass channel 15 and closes the cold air flow path 11 to the outside, so that the air mass flow taken in by the fan 5 and cooled down and dehumidified by flowing across the evaporator 7 is taken through the bypass channel 15 and the cold air flow path 12 to the passenger compartment 9. On the other hand, the air mass flow delivered by the fan 6 and heated by flowing across the condenser 8 is taken to the outside through the warm air flow path 16, which is opened by the air guidance mechanism 18. The warm air flow path 17 is closed.

In the heating mode, the air guidance mechanism 13 opens the cold air flow path 11 and closes the bypass channel 15, so that the air mass flow taken in by the fan 5 and cooled down by flowing across the evaporator 7 is taken through the cold air flow path 11 to the outside. On the other hand, the air mass flow delivered by the fan 6 and heated by flowing across the condenser 8 is delivered to the passenger compartment 9 through the warm air flow path 17, which is now opened by the air guidance mechanism 18, while the warm air flow path 16 is closed.

The embodiment of FIG. 3B and FIG. 4A to 4D only has one fan 37 as compared to the air conditioning system 1 of FIG. 3A, which delivers both the air mass flow through the first flow channel 3 and through the second flow channel 4. This air conditioning system 1 basically comprises three air baffles configured as air guidance mechanisms 13, 27, 28, which are enough for the control process. The air guidance mechanism 28 takes on here the role of the air guidance mechanism 18 from FIG. 3A, that is, the closing and opening of the warm air flow paths 16, 17. The fourth air guidance mechanism 24', configured as a valve, serves to close and open the bypass channel 15.

According to FIG. 4A, the air guidance mechanisms 27, 28 are arranged in the second end position, and thus the condenser 8 is arranged completely inside the second flow channel 4. The air guide mechanism 13 opens the cold air flow path 12 and closes the cold air flow path 11 into the environment. When the evaporator 7 overflows, the stream of cooled and dehumidified air mass is guided by the cold air flow path 12 into the passenger compartment 9. When the condenser 8 overflows, the heated air stream is directed into the environment through the warm air flow path 16, which is opened by the air guidance mechanism 28. The warm air flow path 17 is closed.

In a pure heating operation with unconditioned air according to FIG. 4C, the air guidance mechanism 13 opens the cold air flow path 11 and closes the cold air flow path 12 to the passenger compartment 9, so that when the evaporator 7 overflows, the cool air stream mass is sent into the environment through the cold air flow path 11. On the other side, when the condenser 8 overflows, the heated air stream is brought into the passenger compartment 9 by the warm air flow path 17, which is now opened by the air guidance mechanism 28, while the warm air flow path 16 is closed.

The air guidance mechanisms 27, 28 are in opposite directions from each other. The air guidance mechanism 27 is located in the first end position, while the air guidance mechanism 28 is arranged in the second end position, and at the same time it closes the warm air flow path 16 and opens the warm air flow path 17. The pure heating operation is then connected with unconditioned air when dehumidifying the air being brought into the passenger compartment 9 that is not necessary or not desired.

With the necessary warming during full heating operation and the simultaneous dehumidifying of the air leading into the passenger compartment 9, the second flow channel 4 is closed by the air guidance mechanism 27, which, like the air guidance mechanism 28, is found in the second end position. The whole air stream brought by the fan 37 is guided over the evaporator 7.

The heat output given off at the condenser 8 when there is a closed refrigerant circuit is barely larger than the output brought to evaporator 7. As a result, the air can only be slightly heated when the heat bearing surfaces of the condenser 8 overflow. With the same air stream, only the compressor output and the output through the pure humidification of the air can be brought back, whereby losses to the system are to be reckoned on.

In order to achieve a larger heat output at the condenser 8, and to heat more strongly the air mass leading to the passenger compartment 9, a first part of the air mass is guided through the evaporator 7 and the resulting cooled and dehumidified air mass is guided into the environment, while the second part of the air mass is brought over the condenser 8, warmed by it, and then brought into the passenger compartment 9. The air mass is distributed through control of the air guidance mechanism 24' in the bypass channel 15.

Since the air mass required in the passenger compartment 9 is reduced by the amount sent off into the environment, a greater warming of the air mass required in the passenger compartment 9 is possible. The higher the adjustment of the heating of the air mass guided into the passenger compartment 9, the higher is the proportion of the total air stream fed into the environment. This means it is higher based on the cross-section of the bypass channel 15 released by the air guidance mechanism 24'.

As FIG. 4D shows, the air conditioning system 1 is also operable in a mixed operation, in addition to the pure air conditioning operation and the pure heating operation. In this case, the conditioned air is made up of a portion of the cooled and dehumidified air and a portion of the cooled, dehumidified, and rewarmed air.

The fan 37 sends an air stream through the first flow channel 3, which flows completely over the evaporator 7, and is thereby cooled and dehumidified, and sends an air mass through the second flow channel 4, which is guided over a partial area of the condenser 8 and which is then led back into the heat taken up by the evaporator 7. The air guidance mechanisms 27, 28 are thereby set up in such a way that a first area of the condenser 8 is arranged in the second flow channel 4 and a second area of the condenser 8 is arranged in the first flow channel 3. The air stream brought through the second flow channel 4 is brought back to the environment through the warm air flow path 16, which is released by the air guidance mechanism 28.

A first partial air stream occurring through the conditioned air mass streaming over the evaporator 7 is guided by opening the valve 24' through the bypass channel 15 to the cold air flow path 12. This partial air stream is not conditioned again. A second partial air mass is brought parallel to the first partial stream of air over the second area of the condenser 8 to the warm air flow path 17 and thereby heated. The partial air mass out of the cold air flow path 12 that is brought through the bypass channel 15 and not further conditioned, meaning only cooled and dehumidified, is mixed with the partial air mass out of the warm air flow path 17 that has been brought over the condenser 8 and thereby heated. The partial air flow is then brought into the passenger compartment 9.

Figure 5:
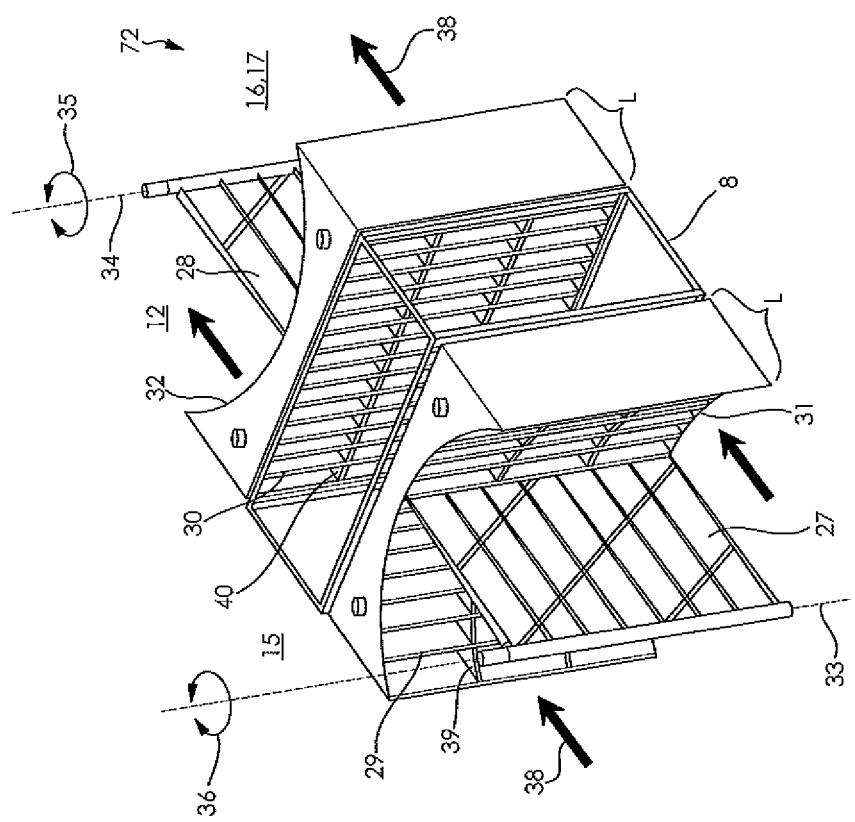
FIG. 5: air guidance device for dividing of air mass flows across the condenser.

FIG. 5 presents an air guidance device 72 with air guidance mechanisms 27, 28, 29, 30, which allow the distribution of the streams of air over the condenser 8. In this way, according to need, one or two air masses are guided over the condenser 8. In the operating mode, a mixture of the various conditioned streams of air with the two air masses is prevented by the air guidance mechanisms 27, 28, 29, and 30.

The air baffles or air device guide mechanisms 29, 30 positioned in an air flow direction 38 positioned before and after the condenser 8 in the gate. The air baffles 29, 30 of the gate are thereby set up perpendicular to the air flow direction 38 at a constant distance, parallel to each other, and connected to each other through transverse struts 39, 40.

The gates have a surface in each case formed as a level plane at the junction with the condenser 8. The surfaces 31, 32 of the gates are oriented in the direction of the air guidance mechanisms 27, 28 and are similarly vaulted. In each case they have a constant distance from the turning axes 33, 34 of the air guidance mechanisms 27, 28. The distance of the concave vaulted surfaces 31, 32 from the turning axes 33, 34 thereby correspond to the radius in relation to the turning axes 33, 34 and to the extension of the air guidance devices 27, 28 in the air flow direction 38.

The air guidance mechanisms 27, 28, stored on the side edges and movable around the turning axes 33, 34 in the direction of the rotation or turning axes 35, 36, are set up and connected with the air baffles 29, 30 to a system. These divide the streams of air into any proportions desired, meaning proportions however large of the heat transfer surface of the condenser 8.

Through simultaneous rotation of the air guidance mechanisms 27, 28 around the individual turning axes 33, 34 in the direction opposite to the direction of rotation or turning axes 35, 36 and at the same angle, the proportion of the areas of the condenser 8 are infinitely adjustable. The air guidance mechanisms 27, 28 are preferentially arranged so that a side edge of an air baffle 29, 30 stands opposite the gate, and as a result the air mass streams along a continuous streaming surface.

It is advantageous if the condenser, for example, is made of flat pipes that are set up with their flat side in the direction of the air baffles 29, 30 and thereby are set in the air flow direction 38. In addition, the number of the air baffles 29, 30 of a gate can advantageously correspond to the number of pipes of the condenser 8, whereby each pipe is set up with a narrow side in the air flow direction 38 of the air flowing to an air baffle 29, 30. Even with various numbers of pipes of the condenser 8 and the air baffle 29, 30, an air baffle 29, 30 and a pipe with its narrow side opposite should be set up.

Even though these arrangements of the air guidance mechanisms 27, 28, the air baffles 29, 30, and the pipes of the condenser 8 reduce this mixture of the split air streams to a minimum, these arrangements are not absolutely necessary. The principle of dividing the air flows when the heat transfer surfaces of the condenser 8 overflow is also achieved if the condenser pipes 8 are not arranged in the direction of the air baffles 29, 30, or even perpendicular to the direction of the air baffles 29, 30. To be sure, the flow resistance of the air baffles 29, 30 set up in the air flow direction 38, and of the pipes of the condenser 8 set up in the same way, is minimal compared to different setups.

Figures 6A, 6B:
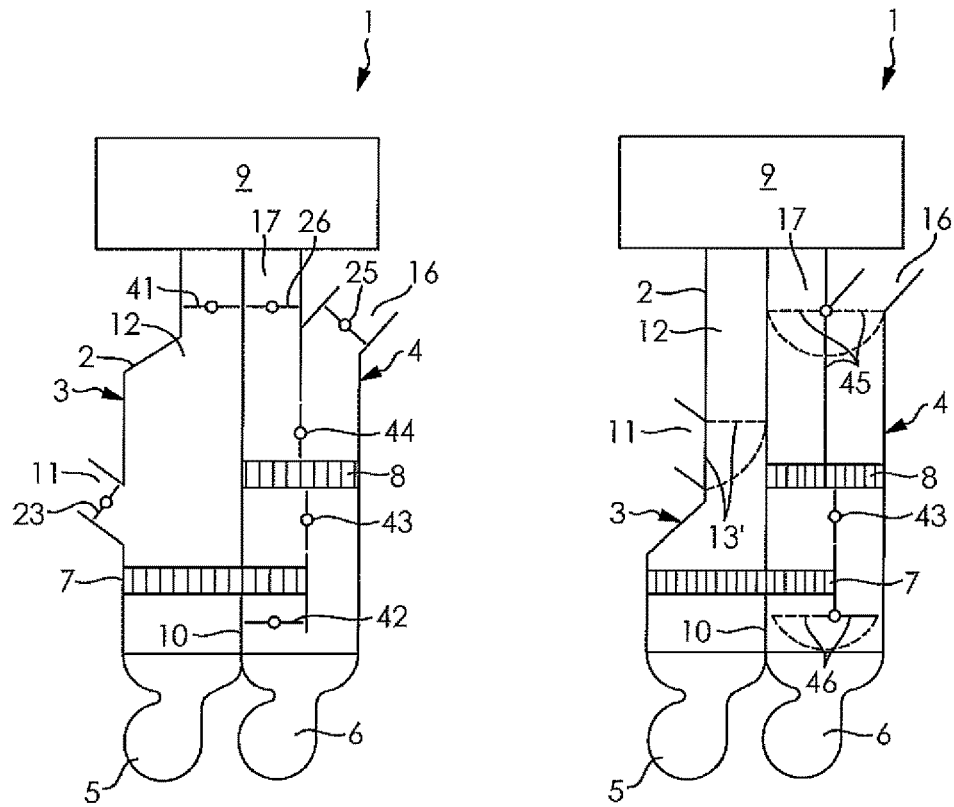
FIG. 6A: air conditioning system with a second flow channel divided into two flow paths.
FIG. 6B: air conditioning system with a second flow channel divided into two flow paths.

FIGS. 6A and 6B show an air conditioning system 1 with a first flow channel 3 and a second flow channel 4, whereby the second flow channel is also divided into two warm air flow paths 16, 17.

The evaporator 7 extends over the entire air flow surface of the first flow channel 3 through the partition wall 10 into the second air flow channel 4, and covers the entire air flow surface of the warm air flow path 16. The condenser 8 covers the entire streaming surface of the second flow channel 4 and thereby both warm air flow paths 16, 17.

With an air guidance mechanism 42 configured as a valve, the first flow channel 3 or the cool air flow path 12 is opened or closed in the direction of the passenger compartment 9 according to FIG. 6A. Through the air guidance mechanism 42, the warm air flow path 17 of the second flow channel 4 is thereby closed or opened at the entry point, that is, between the fan 6 and the evaporator 7. Before and after the condenser 8 in the air flow direction, the set division between the warm air flow paths 16, 17 of the second flow channel 4 is interrupted by air guidance mechanisms 43, 44 configured as movable valves.

During air-conditioning operation, the air guidance mechanisms 23, 26, 42 are closed, while air guidance mechanisms 25, 41, 43, 44 are open. The fan 5 brings an air stream through the first flow channel 3 to the evaporator 7. The air is cooled and dehumidified when the evaporator 7 overflows. After the conditioning, the air flows through the cold air flow path 12 into the passenger compartment 9. The fan 6 brings an air stream through the warm air flow paths 16 to the condenser 8. The air is warmed and let out into the environment.

During heating operation, the air guidance mechanisms 23, 26, 43, 44 are opened, while the air guidance mechanisms 25, 41, 42 are closed. The air stream cooled and delivered by the fan 5 through the first flow channel 3 over the heat transfer surface of the evaporator 7 is guided into the environment through the cold air flow path 11. The fan 6 brings an air mass at the evaporator 7 to the condenser 8. The air is heated and flows through the warm air flow path 17 into the passenger compartment 9.

In post-heating operation, the air guidance mechanisms 23, 25, 26, 41, 42, 43, 44 are positioned in various positions, extending from completely open to completely closed. The air stream to be warmed is determined by the setting of the air guidance mechanisms 25 and 42. The valves 23, 41 and 25, 26, 44 can be coupled together by a kinematic device and adjusted through a single gear.

As FIG. 6B shows, both the valves 23, 41 can be coupled to an air guidance mechanism 13' configured as a valve, and the valves 25, 26, 44 can be coupled to a single air guidance mechanism 45 configured as a valve. The air guidance mechanism 42 at the inlet of the warm air flow path 17 is replaced by an air guidance mechanism 46 that opens or closes either the warm air flow path 16 or the warm air flow path 17.

Figure 7:
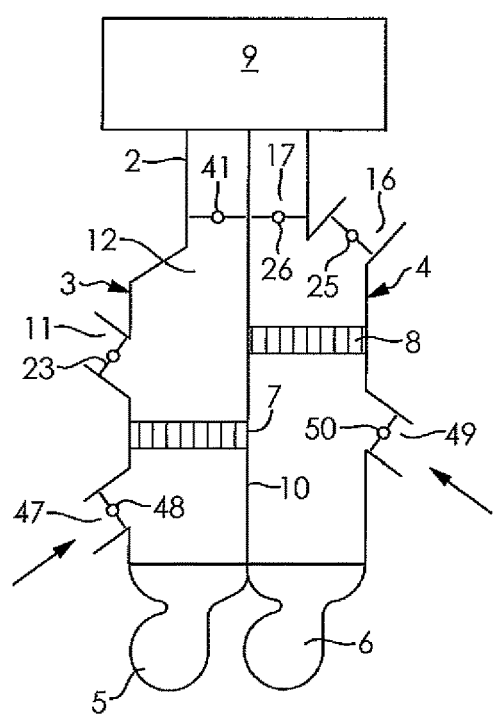
FIG. 7: air conditioning system for auxiliary utilization of the driving wind.

In the embodiment of the air-conditioning system 1 according to FIG. 7, in addition to the streams of air of the driving wind provided by the fans 5, 6, something useful is also achieved with the help of two additional driving wind flow paths 47, 49 and two air guidance mechanisms 48, 50 configured as valves. The driving wind flow path 47 is exposed to air pressure during heating operation. The air guidance mechanism 48 is thereby opened and allows the streaming in of the driving wind into the driving wind flow path 47. The second driving wind flow path 49 is exposed to air pressure during air-conditioning operation, whereby the air guidance mechanism 50 is opened and allows the streaming in of the driving wind into the driving wind flow path 49. The structure of the driving wind flow paths 47, 49 inside the air-conditioning system 1 according to FIG. 7 may be combined with the embodiments of the previous figures, in which the evaporator 7 and/or the condenser 8 are set up overlapping the streaming channel.

According to FIG. 8A, which shows a continuation of the air-conditioning system 1 according to FIG. 7, additional air guidance mechanisms 51, 52 configured as valves are set up at the inlets into the flow channels 3, 4 in order to prevent a backflow from the air masses created by the driving wind through the fans 5, 6.

During the operation of the air-conditioning system and the use of the driving wind, the air guidance mechanisms 23, 26, 48, 52 are closed. The air guidance mechanisms 25, 41, 50, 51 are opened. The fan 5 drives an air mass through the first flow channel 3 to the evaporator 7, where the air is cooled and dehumidified. Then the conditioned air is guided into the passenger compartment 9. As a result of the opened air guidance mechanism 50, driving wind streams through the driving wind flow path 49 into the second flow channel 4. The air mass streams over the heat transfer surfaces of the condenser 8, where it is warmed and then sent through the warm air flow path 16 to the outside.

During heating operations, the air guidance mechanisms 23, 26, 48, 52 are opened, while the air guidance mechanisms 25, 41, 50, 51 are closed. As a result of the opened air guidance mechanism 48, the driving wind streams through the driving wind flow path 47 into the first flow channel 3. The air streams over the heat transfer surfaces of the evaporator 7 and is guided through the cold air flow path 11 to the outside. The fan 6 sends an air mass through the second air flow channel 4 to the condenser 8, where the air flow is heated and then guided through warm air flow path 17 into the passenger compartment 9.

As FIG. 8B shows, the driving wind flows differently than the embodiment in FIG. 8A through the air wheels of the fans 5, 6. During air conditioning operation, the driving wind is guided by the fan 6, while the driving wind during heating operation is guided by the fan 5.

FIG. 9A shows a partial area of the air conditioning system 1 with flow paths 55, 56, 57 set up in the flow direction of the air in front of the fans 5, 6 for exposure of the fans to the driving wind according to FIG. 8B.

FIG. 9a shows a partial area of the air conditioning system 1 with flow paths 55, 56, 57 set up in the flow direction of the air in front of the fans 5, 6 for exposure of the fans to the driving wind according to FIG. 8b.

The flow paths 55, 57 are opened, partially opened, or closed by an air guidance mechanism 58 configured as a valve. The valve 58 is set up in a mixing zone, into which the flow paths 55, 57 discharge and move over to the fan 5 in an air flow path 53. The flow path 57 set up between the outer flow paths 55, 56 branches into two sub-paths before reaching the mixing zone, whereby the first sub-path leads to the valve 58 and the second sub-path leads to an air guidance mechanism 59 configured as a valve.

The valve 59 is also set up in a mixing zone, into which the flow paths 56, 57 discharge and move over to the fan 6 in a flow path 54. The valve 59 serves to open, partially open, or close the flow paths 56, 57.

Figure 9B:
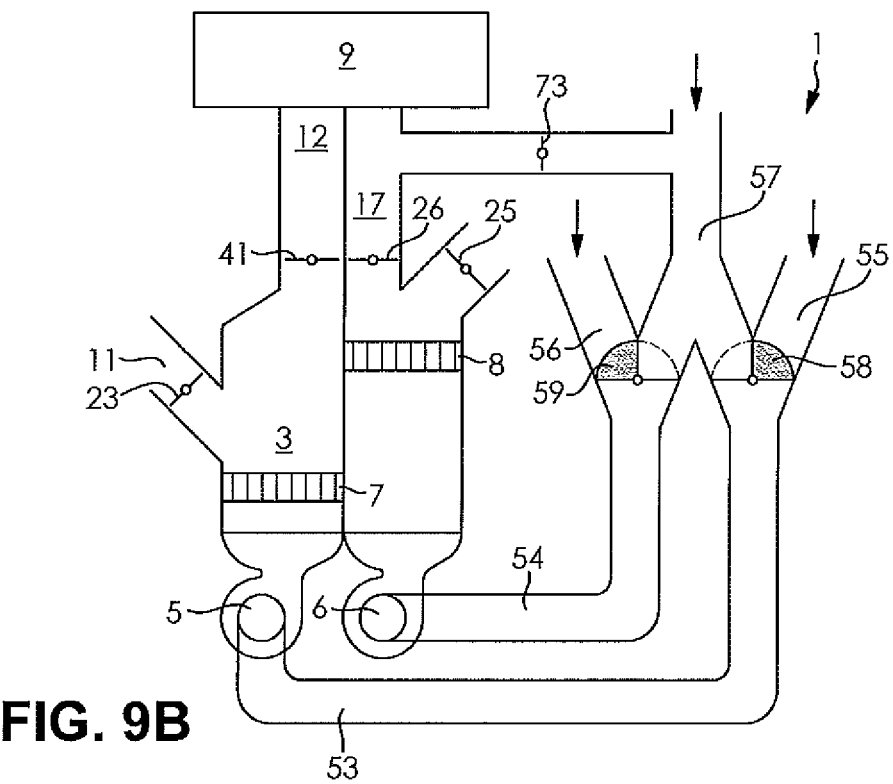
FIGS. 9B and 9C: connections of the flow paths of FIG. 9A to the air conditioning system.
Figure 9C:
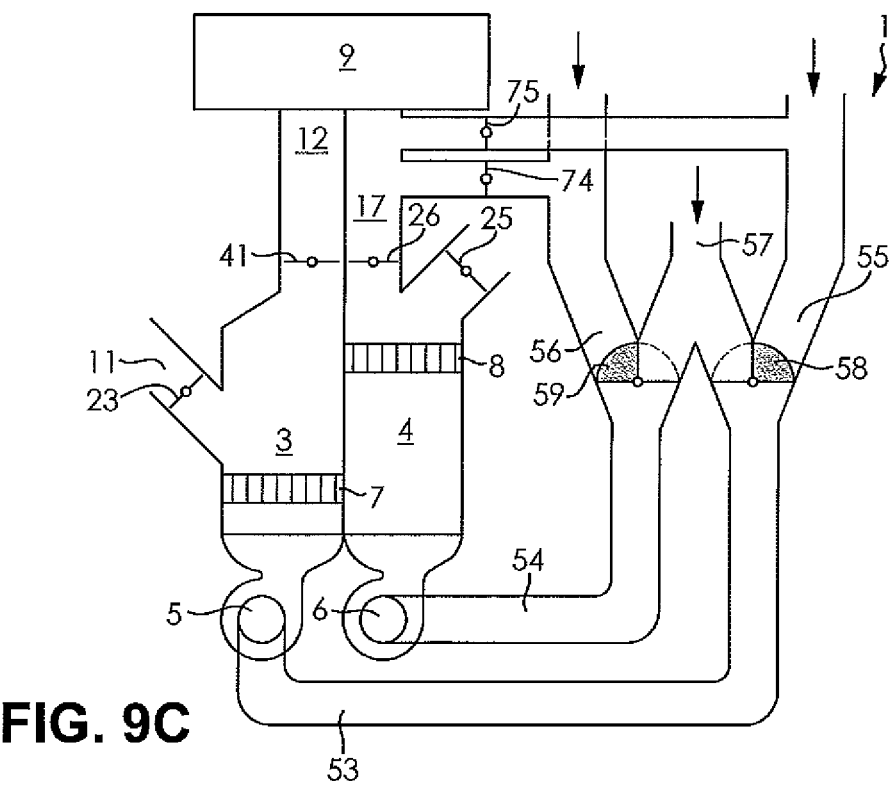

FIGS. 9B and 9C illustrate the connections of the flow paths 55, 56, 57 according to FIG. 9A to the air-conditioning system 1. The external flow paths 55, 56 are exposed to fresh air from the outside, while the inner flow path 57 receives circulating air from the passenger compartment 9. The valves 58, 59 are also set up in such a way that circulating air is recycled. The flow paths 55, 56 for the fresh air from the outside are closed.

In the embodiment according to FIG. 9B, the circulating air provided by the inner flow path 57 can be mixed together with heated air from the overflow of the condenser 8. Thereby, the heated air is drawn away from the warm air flow path 17 and the circulating air is mixed together in front of the evaporator 7 or the condenser 8. An air channel that connects the warm air flow path 17 with the flow path 57 is provided with another air guidance mechanism 73 configured as a valve. The air channel is closed or opened as needed with the valve 73.

According to the alternative embodiment in FIG. 9C, fresh air provided by the outer flow paths 55, 56 can be mixed together in each case with the heated air from the overflow of the condenser 8. The heated air is also drawn away from the warm air flow path 17 and is mixed with the fresh air in front of the evaporator 7 or the condenser 8. Thereby a first air channel connects the warm air flow path 17 to the flow path 55, while a second air channel connects the warm air flow path 17 to the flow path 56. Both air channels are closable with an air guidance mechanism 74, 75 configured in each case as a valve. In the illustrated setting of the air guidance mechanism 74, 75, the air channels are closed.

With the formation of the circulating channels according to FIGS. 9B and 9C, it is possible, in particular in the heating operation, to increase the efficiency of the air-conditioning system 1 by heating the refrigerant on the suction pressure side above the outside temperature. Thereby the evaporator 7 is exposed to partial circulating air or full circulating air, so that the temperature of the air in front of the evaporator 7 is greater than the temperature of the fresh air in the environment. The circulating channels thereby serve as bypasses between the second flow channel 4 in the flow direction of the air behind the condenser 8 and the first flow channel 3 in the flow direction of the air in front of the evaporator 7. Warm air from the warm air flow path 17 is mixed into the first flow channel 3, which by connection flows to the evaporator 7.

The entire air distribution system of the air-conditioning system 1 includes other air guidance mechanisms and adjustment motors configured as valves, which are not illustrated in the figures.

Figure 10A:
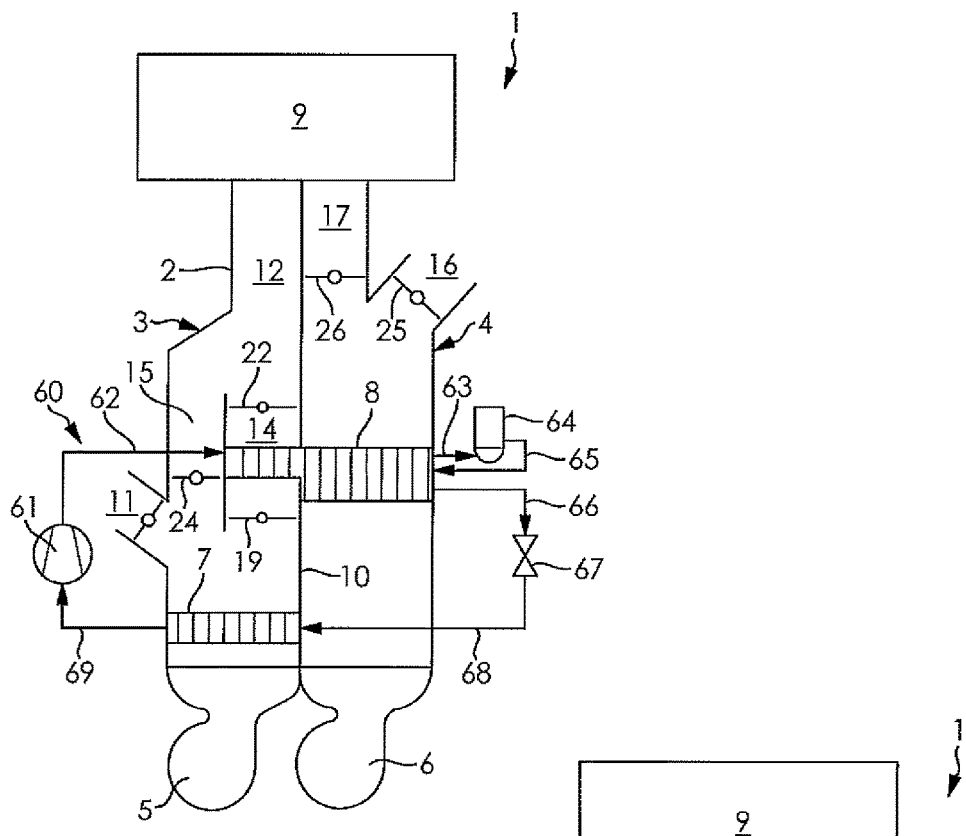
FIGS. 10A and 10B: air conditioning system of FIG. 2A with complete refrigerant circuit.
Figure 10B:
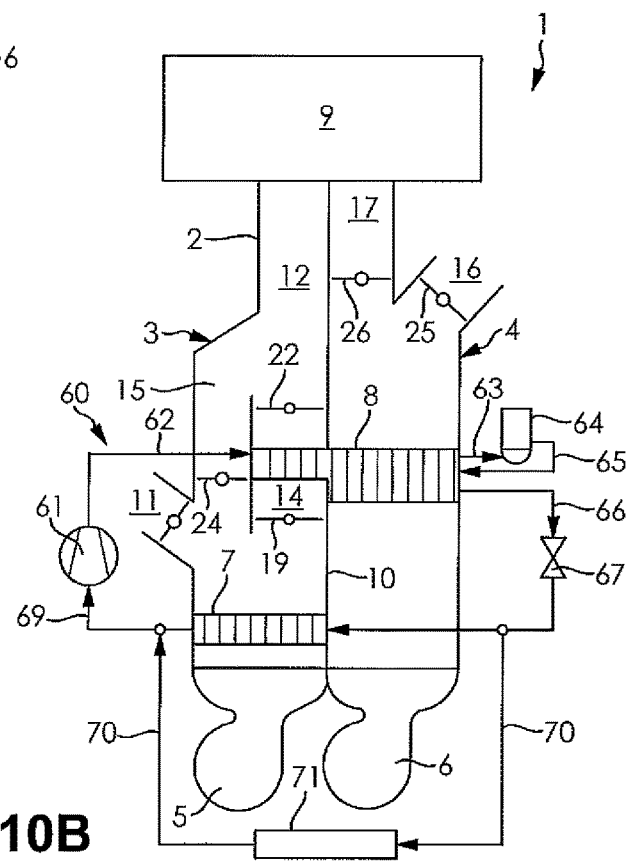

In FIGS. 10A and 10B, the air-conditioning system 1 according to the embodiment in FIG. 2A is presented in an integrated, closed, and complete refrigerant circuit 60 in the air-conditioning system 1. The refrigerant circuit shown is for R134a, R744, R1234yf or other refrigerants.

The refrigerant circuit 60 includes the evaporator 7, a compressor 61, the condenser 8, a collector 64, and an expansion element 67. The components of the refrigerant circuit 60 are connected by means of refrigerant lines 62, 63, 65, 66, 68, 69. The suction line 69 connects the evaporator 7 to the compressor 61, while the refrigerant line 62 connects the compressor 61 to the condenser 8. The refrigerant streams through the refrigerant line 63 of a first section of the condenser 8 to the collector 64. The refrigerant lines 65 and 66 connect the collector 64 to the inlet of a second section of the condenser 8 and the outlet of the second section of the condenser 8 to the expansion element 67. From the expansion element 67 the refrigerant flows through the refrigerant line 68 to the evaporator 7.

The compressor 61 is advantageously configured as an electrically driven compressor, but alternatively it can also be driven by an internal combustion engine of the vehicle. The expansion element 67 is preferentially configured as an adjustable expansion element or expansion valve.

As FIG. 10B shows, according to another form of the embodiment according to FIG. 10a the refrigerant circuit 60 has another evaporator 71, which is connected parallel to the evaporator 7 set up in a first flow channel 3. Thereby the required cooling services of the evaporators 7, 71 are adjustable independently of each other.

The second evaporator 71 is connected to the air-conditioning system 1 via two refrigerant lines 70 and cooling is provided with a drive battery, a high-power electronic unit, or some other vehicle component. Thereby the second evaporator 71 can be configured as a contact cooler, for example for a battery directly cooled by refrigerant, as a refrigerant-cold water-heat transfer body, also called a chiller, or configured as a refrigerant-air-heat transfer body.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE NUMBERS 1 air conditioning system
2 housing
3 first flow channel
4 second flow channel
5, 6 fan
7 evaporator
8 condenser
8a-8g components of condenser 8
9 passenger compartment
10 partition wall
11, 12 cold air flow path
13,13' air guidance mechanism/valve of the cold air flow paths 11, 12
14 flow path in the first flow channel 3
15 bypass channel in the first flow channel 3
16, 17 warm air flow path
18 air guidance mechanism/valve of the warm air flow paths 16, 17
19 air guidance mechanism for inlet to flow path 14
20, 21 air guidance mechanism between first and second flow channel 3, 4
22 air guidance mechanism for outlet from flow path 14
23 air guidance mechanism/cold air valve for cold air flow path 11
24,24' air guidance mechanism/valve for bypass channel 15
25, 26 air guidance mechanism/valve of warm air flow path 16, 17
27 air guidance mechanism/valve between first and second flow channel 3, 4 entering the condenser 8
28 air guidance mechanism/valve between first and second flow channel 3, 4 leaving the condenser 8
29, 30 static air guidance mechanism/air baffle
31, 32 surface of static air guidance mechanism 29, 30
33, 34 axis, turning axis of the air guidance mechanism 27, 28
35, 36 turning axis of the air guidance mechanism 27, 28
37 fan
38 air flow direction
39, 40 transverse strut, support plate
41 air guidance mechanism/cold air valve for cold air flow path 12
42 air guidance mechanism for inlet to flow path 17
43, 44 air guidance mechanism/valve between warm air flow paths 16, 17 entering the Condenser 8
45 warm air guidance mechanism for warm air flow paths 1, 17
46 air guidance mechanism for inlet to the second flow channel 4
47, 49 driving wind flow path
48, 50 air guidance mechanism/valve for driving wind flow path 47, 49
51 air guidance mechanism/valve for inlet to first flow channel 3
52 air guidance mechanism/valve for inlet to second flow channel 4
53, 54 flow path
55, 56, 57 flow path
58, 59 air guidance mechanism/valve
60 refrigerant circuit
61 compressor
62, 63 refrigerant line, pressure line
64 collector
65, 66, 68 refrigerant line, pressure line
67 expansion element
69 refrigerant line, suction line
70 refrigerant line
71 evaporator
72 air guidance device
73 air guidance mechanism/valve of air channel
74, 75 air guidance mechanism/valve of air channel

What is claimed is:

1. An air conditioning system for cooling, heating, and reheating an air supply for a vehicle comprising:
   a housing having a first flow channel and a second flow channel formed therein, the first flow channel configured for receiving a first flow of the air supply and the second flow channel configured for receiving a second flow of the air supply, the first flow channel divided into a first flow channel flow path and a bypass channel;
   a partition wall disposed intermediate the first flow channel and the second flow channel, the partition wall separating the first flow channel from the second flow channel wherein the first flow of the air supply is not in fluid communication with the second flow of the air supply within the housing;
   a first evaporator disposed in the first flow channel, wherein the first evaporator extends across an entirety of a flow cross-section of the first flow channel, wherein a first end of the first evaporator is disposed adjacent an inner surface of the housing defining a portion of the first flow channel and a second end of the first evaporator is disposed adjacent an inner surface of the partition wall defining a boundary of the first flow channel;
   a condenser having a first region and a second region, the first region disposed in the second flow channel and the second region disposed in the first flow channel flow path; and
   a plurality of air guidance mechanisms arranged in the housing and cooperating to direct the air supply through at least one of the first flow channel and the second flow channel.

2. The air conditioning system of claim 1, further comprising a refrigerant circuit, the refrigerant circuit having a compressor and an expansion element in fluid communication with the first evaporator and the condenser.

3. The air conditioning system of claim 2, wherein the refrigerant circuit further comprises a second evaporator in fluid communication with the first evaporator and the condenser.

4. The air conditioning system of claim 1, further comprising at least a first fan and a second fan, the first fan in fluid communication with the first flow channel and the second fan in fluid communication with the second flow channel.

5. The air conditioning system of claim 4, further comprising a first valve disposed downstream of the first fan at an inlet of the first flow channel and a second valve disposed downstream of the second fan at an inlet of the second flow channel.

6. The air conditioning system of claim 4, wherein the first fan directs the air supply during a heating mode of the air conditioning system and the second fan directs the air supply during a cooling mode of the air conditioning system.

7. The air conditioning system of claim 4, further comprising a first flow path disposed upstream from the first fan, a second flow path disposed upstream from the second fan, and a third flow path disposed upstream from the first fan and the second fan, the first flow path and the second flow path receiving at least one of air from the vehicle, outside air, and air from the second flow of the air supply through the second channel, the third flow path receiving at least one of the air from the vehicle and the air from the second flow of the air supply through the second channel.

8. The air conditioning system of claim 1, further comprising a first static air guidance mechanism disposed adjacent and in fluid communication with an inlet of the condenser and a second static air guidance mechanism disposed adjacent and in fluid communication with an outlet of the condenser.

9. The air conditioning system of claim 8, wherein a first air guidance mechanism of the plurality of air guide mechanisms is disposed upstream from the first static air guidance mechanism with respect to the flow of the air supply and a second air guidance mechanism of the plurality of air guidance mechanisms is disposed downstream from the second static air guidance mechanism with respect to the flow of the air supply.

10. The air conditioning system of claim 8, wherein the first static air guidance mechanism and the second static air guidance mechanism are formed from a plurality of baffles arranged in parallel to maintain the first flow of the air supply separate from the second flow of the air supply through the condenser, the baffles coupled to each other by transverse struts to form a lattice.

11. The air conditioning system of claim 9, wherein each of the first air guidance mechanism and the second air guidance mechanism is adapted to cooperate with the first static air guidance mechanism and the second static air guidance mechanism to at least partially allow at least one of the first flow of the supply air and the second flow of the supply air.

12. The air conditioning system of claim 11, wherein the first air guidance mechanism rotates about a first axis and the second air guidance mechanism rotates about a second axis, the first axis and the second axis are perpendicular to a direction of the flow of the air supply.

13. The air conditioning system of claim 12, wherein the first axis is disposed at a distance from the first static air guidance mechanism substantially equal to a dimension of the first air guidance mechanism with respect to the direction of the flow of the air supply and the second axis is disposed at a distance from the second static air guidance mechanism substantially equal to a dimension of the second air guidance mechanism with respect to the direction of the flow of the air supply.

14. The air conditioning system of claim 13, wherein the first static air guidance mechanism has a curvilinear profile corresponding to a radius with respect to the first axis and the second static air guidance mechanism has a curvilinear profile corresponding to a radius with respect to the second axis, the radius with respect to the first axis is substantially equal to the dimension of the first air guidance mechanism and the radius with respect to the second axis is substantially equal to the dimension of the second air guidance mechanism.

15. The air conditioning system of claim 1, further comprising a first fan in fluid communication with the first flow channel and the second flow channel, the first fan providing the first flow of the air supply to the first flow channel and the second flow of the air supply to the second flow channel.

16. The air conditioning system of claim 1, further comprising a first driving wind flow path in fluid communication with the first flow channel and a second driving wind flow path in fluid communication with the second flow channel.

17. The air conditioning system of claim 1, wherein the second flow of the air supply passing through the second flow channel does not flow through the evaporator.

18. An air conditioning system for cooling, heating, and reheating an air supply for a vehicle comprising:
    a housing having a first flow channel and a second flow channel formed therein, the first flow channel configured for receiving a first flow of the air supply and the second flow channel configured for receiving a second flow of the air supply, the first flow channel divided into a first flow channel flow path and a bypass channel;
    a first evaporator disposed in the first flow channel, wherein the first evaporator extends across an entirety of a flow cross-section of the first flow channel, wherein a first end of the first evaporator is disposed adjacent an inner surface of the housing defining a portion of the first flow channel and a second end of the first evaporator is disposed adjacent an inner surface of the partition wall defining the first flow channel;
    a condenser having a first region and a second region, the first region disposed in the second flow channel and the second region disposed in the first flow channel flow path;
    a plurality of air guidance mechanisms arranged in the housing and cooperating to direct the air supply through at least one of the first flow channel and the second flow channel;
    an air guide device having a first static air guidance mechanism disposed adjacent and in fluid communication with an inlet of the condenser and a second static air guidance mechanism disposed adjacent and in fluid communication with an outlet of the condenser, and a first air guidance mechanism of the plurality of air guide mechanisms disposed upstream from the first static air guidance mechanism with respect to the flow of the air supply and a second air guidance mechanism of the plurality of air guidance mechanisms disposed downstream from the second static air guidance mechanism with respect to the flow of the air supply; and
    at least one fan disposed upstream the first flow channel and the second flow channel.

19. A method for operating an air conditioning system for cooling, heating, and reheating and air supply for a vehicle comprising the steps of:
    providing a housing with a first flow channel for receiving a first flow of the air supply, a second flow channel for receiving a second flow of the air supply, and a condenser disposed in at least the first flow channel and the second flow channel, wherein a partition wall is disposed intermediate the first flow channel and the second flow channel, the partition wall separating the first flow channel from the second flow channel, wherein the first flow channel is divided into a first flow channel flow path and a bypass channel, wherein the condenser has a first region and a second region, the first region disposed in the second flow channel and the second region disposed in the first flow channel flow path, wherein an evaporator is disposed in the first flow channel, wherein the first evaporator extends across an entirety of a flow cross-section of the first flow channel, and wherein a first end of the first evaporator is disposed adjacent an inner surface of the housing defining a portion of the first flow channel and a second end of the first evaporator is disposed adjacent an inner surface of the partition wall defining the first flow channel;

arranging a plurality of air guidance mechanisms to guide the first flow of air and the second flow of air through the housing; and adjusting the amount of the first flow of air and the second flow of air through the condenser with an air guidance device.

\* \* \* \* \*